Figure 1:
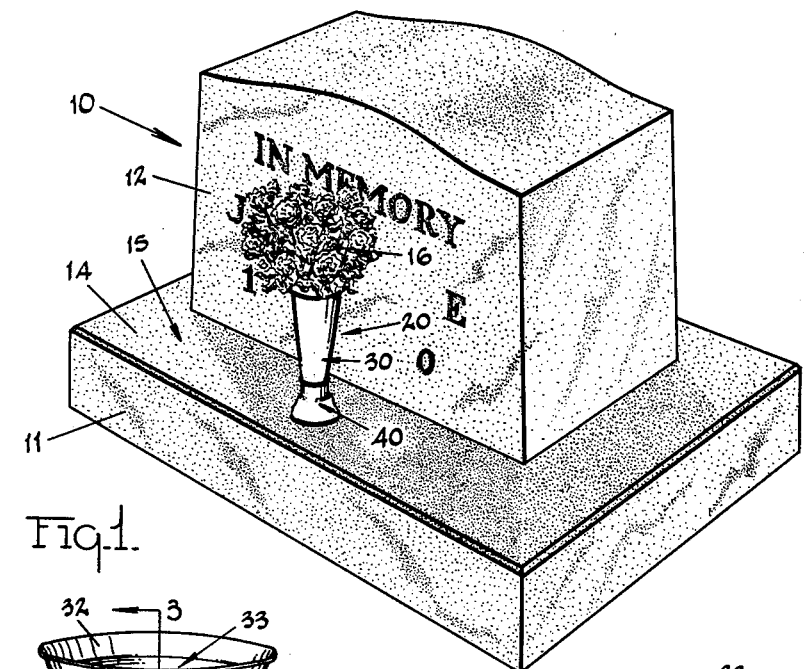

Aug. 4, 1964 A. J. MEHLING 3,142,934
FLOWER OR PLANT HOLDER FOR TOMBSTONE
Filed Nov. 8, 1962 2 Sheets-Sheet 1

Inventor
Alfred J. Mehling
By
Attorney

Aug. 4, 1964 A. J. MEHLING 3,142,934
FLOWER OR PLANT HOLDER FOR TOMBSTONE
Filed Nov. 8, 1962 2 Sheets-Sheet 2
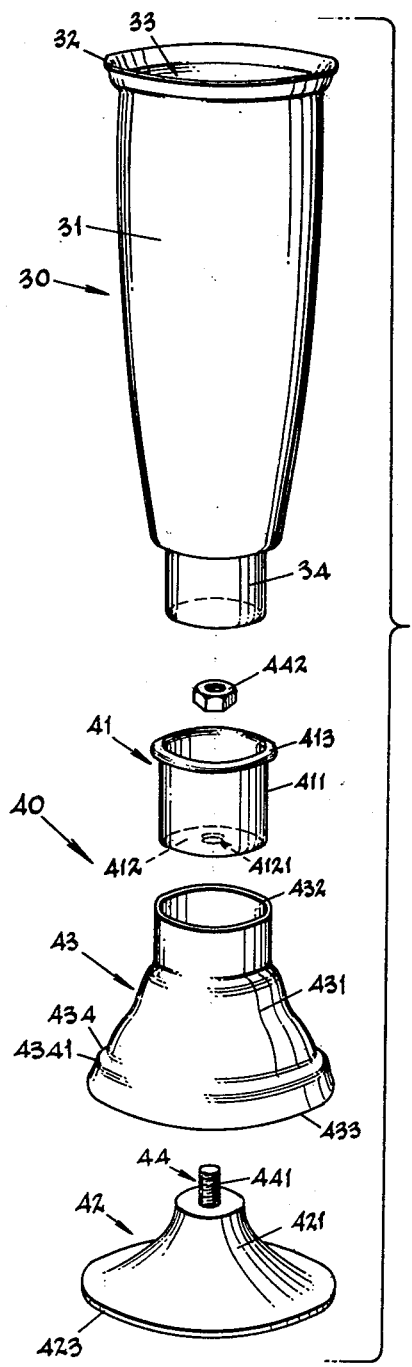
Fig. 4.
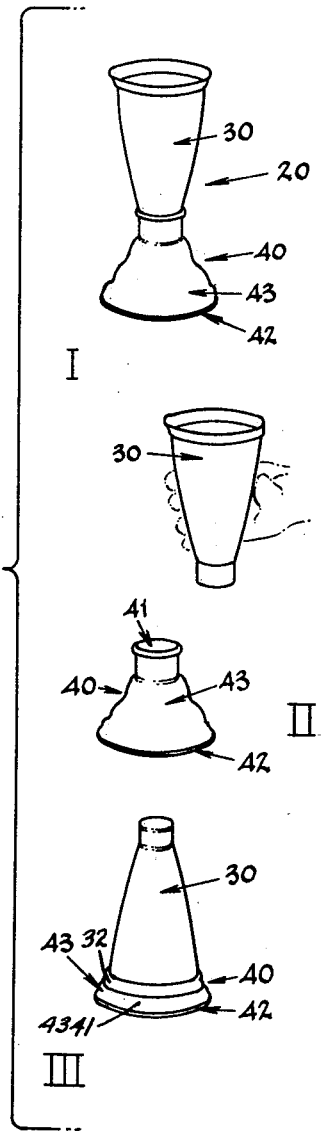
Fig. 5.
Inventor
Alfred J. Mehling
Attorney United States Patent Office 3,142,934
Patented Aug. 4, 1964

3,142,934
FLOWER OR PLANT HOLDER FOR TOMBSTONE
Alfred J. Mehling, 1214 Colburn St., Toledo 9, Ohio
Filed Nov. 8, 1962, Ser. No. 236,362
3 Claims. (Cl. 47—34)

My invention broadly concerns the art of displaying flowers or plants, usually in a sustaining or growing medium, in relation to or on a grave marker.

More particularly the invention relates to aspects of attaching a flower or plant holder to a tombstone or grave marker and of weather guarding such relation, once established.

The invention has for one of its principal objects to provide a flower or plant holder for a tombstone having means by which the flower or plant holding member may be held against accidental displacement from an upright holding position but may, under intentional manual direction, be disengaged and be rendered portable for transportation, as to a source of water, or for inversion to empty or for replacing the contents thereof.

Another major object of my invention is to provide a flower or plant holder for a tombstone having means by which the holder thereof may be attached to a tombstone without opening or breaking the finished surface of the tombstone and thus opening the stone to discoloring or destructive moisture penetration. In this same connection, my invention has for a more particular object to provide means by which the aforementioned attaching means is shrouded and thus protected from weather. Such shrouding protection tends to prolong the longevity and effectiveness of the attaching means and provides an aesthetic quality to the assembly.

A further particular object of my invention is advanced in part as a consequence of the mentioned detachability of the holder. Such object is to provide a flower or plant holder for a tombstone having means by which the flower or plant holder thereof, when not in use, may be inverted and attached to the base thereof to thereby house the base against weather and, more importantly, to reduce the space normally occupied by the holder and its projection beyond the tombstone surface. This becomes important to the user in the winter or snow months of exposure. Reducing the dimensions of projection, when not in use, is important to grave yard maintenance in that the chance of conflict with up-keep tools or personnel is reduced.

The invention has other and further objects among which are those of providing other advantageous structures and arrangements which will appear from the following description and from an examination of the accompanying drawings. Flower or plant holders for a tombstone embodying my invention may take various forms, one of which appears now to me to be the best mode by which the teachings of my invention may be carried out. I shall describe that form and, in doing so, will make reference to the accompanying drawings. However, I do not imply, by such description and reference, that variation from such described or illustrated form is beyond the contemplation of the invention I make manifest herein.

FIG. 1 of the accompanying drawings shows a flower or plant holder embodying the features of my invention in an installed position of use on a tombstone.

Figure 2:
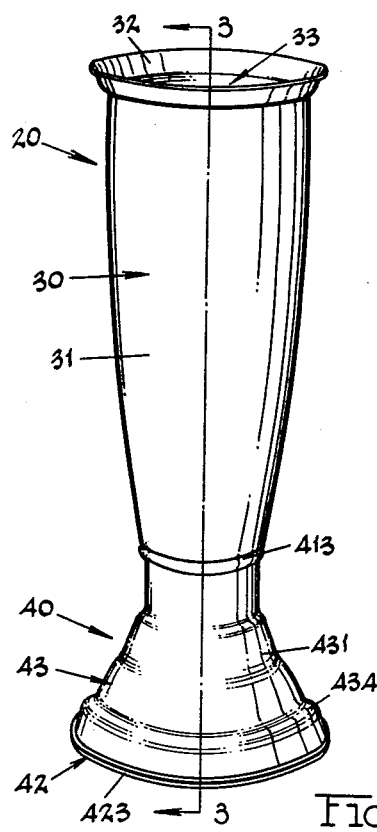

FIG. 2 of the drawings shows the flower or plant holder illustrated in FIG. 1 in an enlarged elevation.

Figure 3:
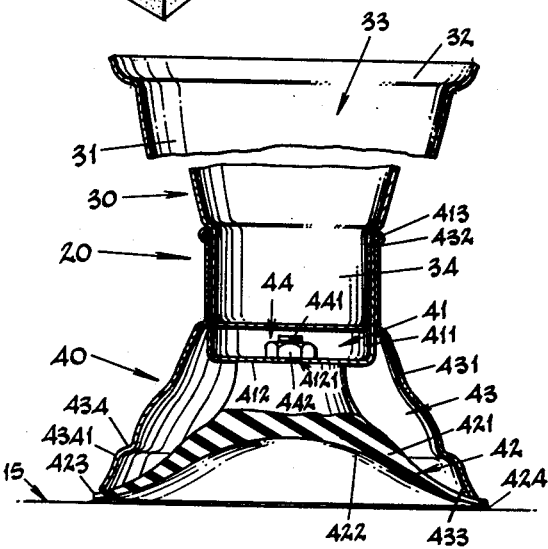

FIG. 3 of the accompanying drawings illustrates a view of a section taken along the plane of the line 3—3 indicated in FIG. 2.

FIG. 4 of such drawings shows an exploded view of the members and parts which combine to form the flower or plant holder shown in the previously mentioned figures.

FIG. 5 illustrates, substantially diagrammatically, various positions in which the members may be placed to serve the several functions and advantages herein mentioned.

Turning first to FIG. 1 of the accompanying drawings, one observes a suitable tombstone 10 to be shown there. The tombstone 10 comprises a base 11 and block 12. The base 11 has a ledge 14 projecting laterally, as from the block 12, and providing a surface 15 on which a flower or plant holder 20 embodying my invention is shown supported.

The flower or plant holder 20, shown best in FIGS. 2, 3 and 4 of the drawings, comprises a cup member 30 and a base member 40.

The cup member 30 may be of a chalice shape having a bowl 31 which communicates with the exterior over lips 32 on its upper end and defining an opening 33. Flower stems, such as those illustrated at 16, in FIG. 1, or plant stems may extend through the opening 33 into and be sustained in the bowl 31. Some suitable sustaining or growing medium for the flowers or plant in the bowl may also be contained in the bowl 31. Thus, the cup member 30 provides a flower or plant holder.

In order that the cup member 30 may be sustained, in some suitable display relation, such as that shown in FIG. 1 of the drawings, the cup member has a foot portion 34. Preferably, the foot portion 34 is cylindrical in shape, having its major longitudinal axis in concentric relation to that of the bowl portion 31 of the cup member 30. As will later appear, the dimensions of the foot portion 34, particularly that of the outer diameter thereof, and the shape of the foot portion 34 are such as to mate reasonably snugly with a female socket part 41 on the base member 40.

The base member 40 is a composite of parts comprising the mentioned socket part 41, a foot part 42, a shroud part 43, and a connector complex part 44. These parts are best shown in FIGS. 3, 4 and 5 of the accompanying drawings.

The foot part 42 is preferably a flexible body 421, such as one of molded rubber, having a spherical concave bottom surface 422 that is bounded by a continuous perimeter lip 423. Those skilled in the art will recognize in the form of the foot part 42 and its inclusion of the surface 422 and lip 423 an adaptation of the well known suction cup. The foot part 42 provides an attaching means which, by virtue of the flexibility of the body 421 cushions and shields the tombstone from contact with the other parts of the base member 40 and may also serve in affixing the base member 40 to the tombstone as will be explained.

The shroud part 43 of the base member is preferably a metal sleeve 431 having open upper and lower ends 432 and 433. The dimensions of the shroud part 43 are such that the foot part 42 may be enclosed therein with its surface 422 in registry and extending across to preferably entirely close and extend radially a bit beyond the edge of the lower open end 433 of the shroud part 43. The open upper end 432 of the shroud part 43 is dimensioned to receive and telescopically fit about the socket part 41, as shown best in FIG. 3 of the accompanying drawings.

The socket part is a thimble with a cylindrical wall 411, a closed lower end 412 and a bead 413 surrounding open upper edge of the wall 411. As mentioned, the socket part fits into the upper end opening 432 of the shroud part 43 to be engaged along the bead 413 by the edge of the open end 432 of the shroud part and by elements of the connector parts complex 44. The connector part complex connects the socket part 41 to the foot part 42.

The connector parts complex 44 includes a threaded shank or bolt element 441, preferably embedded in the body 421 of the foot part 42. A therewith cooperative element of the connector parts complex 44 is a threaded nut 442 adapted for engagement with the bolt element 441.

In assembly, the foot part 42 is placed in the shroud part 43 with the bottom surface 422 of the foot part in registry with the lower open end 433 of the shroud part and with the therein embedded bolt element 441 extending upwards toward the upper open end 432 of the shroud. Then, the socket part 41 is inserted, with its closed lower end 412 leading, into the open upper end 432 of the shroud part. The lower end 412 of the socket part has a small opening 4121 through which the bolt element 441 is directed, during the insertion of the socket part into the shroud part. Now, the nut element 442 may be threaded onto the bolt element 441 and when appropriately turned down will operate to draw the socket and foot parts toward each other. Drawing the socket and foot parts together causes the bead 413 of the socket part 41 to engage the edges of the open upper end 432 of the shroud part and the body 421 of the foot part to engage the edges of the lower open end 433 of the shroud part, whereby the shroud part 43 is forced to center about the socket and foot parts and is effectively clamped against movement therefrom between these parts.

With such assembly, the base member 40 provides suitable means by which the cup member 30 may, when the foot portion 34 thereof is inserted in the socket part 41, be removably supported upright in a flower or plant exhibiting relation. The base member 40 also provides means, in its relation to the cup member 30, by which the cup member may enclose substantial portions of the base member to shroud the same against weather and reduce the overall size of the holder, when not in flower or plant holding use.

This last named means comprises an annular shoulder 434 on the shroud part 43. The shoulder 434 is preferably concentric with the major longitudinal axis of the shroud part and is disposed between the two ends 432 and 433 thereof. Preferably, however, the shoulder 434 is more nearly proximate the lower end 433 of the shroud part.

The shoulder 434 has an annular surface 4341 that extends as a band around the shroud part 43. This surface bears a critical dimensional relation to the lips 32 and opening 33 of the cup member 30. Such relation is one that when the cup member is inverted, as shown diagrammatically in lowest one III of the use phases illustrated in FIG. 5 of the drawings, the surface 4341 can mate snugly with the inner surface of the cup member 30 to frictionally engage the same. As illustrated such disposition and provision, allows the cup member to enclose and protect the base member 40 and effectively diminishes the space occupied by the members when not in use.

To associate the base member 40 and thus the cup member 30 with a tombstone in a relation like that shown with tombstone 10 in FIG. 1 of the accompanying drawings, the foot part 42 of the base member may be pneumatically secured, adhesively secured or both pneumatically and adhesively secured to a surface like 15 of the tombstone. When securement desired is temporary and easy disengagement desired, pneumatic securement is better than adhesive securement. This is accomplished by pressing the foot part toward the tombstone surface 15 to cause the lip 423 surrounding the spherical concave surface 422 to engage the surface 15 of the tombstone as the body 421 is deformed to reduce the space between the surfaces 422 and 15. Part of the air between the surfaces 422 and 15 is thus expelled under the lip 423 and so that, when the foot part 42 is subsequently released, a condition of slight rarefication of air will exist between the surfaces 422 and 15. This causes the lip 423 to cling to the surface 15 operating to seal the space between surfaces 15 and 422 and establishes differential in pressure between that within the intersurface space and the exterior thereof which will effectively secure the base member 42 to the tombstone.

Such pneumatic securing is more effective and easier to effect when the surface 15 is highly polished, enabling the lip 423 to work an effective seal therewith. In order to obtain securement where the surface 15 does not lend itself to pneumatic attachment, a suitable adhesive, like that shown at 424 may be applied to either or both of the surfaces 15 and 422, preliminary to pressure of the foot part against the surface 15. Sometimes, it is advisable to use a securing adhesive when pneumatically attaching the foot part. An adhesive 424 on surface 15 often fills out the unevenness of that surface and allows pneumatic securement in situations otherwise unattainable.

Preferably, as will be noted from FIG. 3 of the drawings, the body 421 of the foot part 42 flares outwardly so that in the vicinity of its surface 422 it dimensionally exceeds the inner dimension of the lower end 433 of the shroud part 43. This will assure that a resilient buffer area will extend between the lower end 433 of the shroud part and the surface 15 of the tombstone 10. The provision of such buffer cushions the stone and its surface against scratching and combats any tendency toward a stone to metal weather reaction during periods of long use.

Thus, it will be seen that my invention provides a readily adaptable but also aesthetic flower or plant holder for a tombstone. In use, the cup member 30 may be manually directed and manipulated as illustrated diagrammatically in phases I and II of FIG. 5 of the accompanying drawings to obtain the advantages of portability and display. When use as a display is to be discontinued, in expectancy of a later reuse, the cup member may be inverted, as shown in phase III of FIG. 5, and mounted to cover the base member 40 until such later time.

I claim:
1. In a flower or plant holder for a tombstone,
 a base member comprising a shroud part, a foot part, a socket part and a connector part; and
 a cup member having an opening at one end and a foot portion of cylindrical shape at the other end;
 in which
 the shroud part is a sheet metal sleeve open at each opposite end and has an annular shoulder in concentric relation to the major longitudinal axis of the sleeve bearing an annular surface of a diameter substantially equal to that of the cup member opening and more proximate one end of the shroud part than the other end;
 the foot part is a body of molded rubber having
 a substantially spherical concave face in registry with and extending entirely across to close the mentioned one end of the shroud part, and
 an annular flexible lip integral with and projecting outwardly from the mentioned face
 adapted, when the foot part is pressed to direct its mentioned face against a tombstone, to engage a surface thereof and to be itself distorted and to distort the foot part thereby allowing air between the tombstone surface and mentioned face to expel so that the mentioned face may be brought to approach the tombstone surface and, when the foot part is released, sealing the intersurface space that air between the foot part face and tombstone surface is rarefied and at a lower than atmospheric pressure whereby the foot part is pneumatically secured to the tombstone;
 the socket part is a cylindrical metal thimble having
 a beaded edge and
 being of an outer diameter substantially equal to the inner diameter of the mentioned other end opening of the shroud part as to be telescopically insertable therein to a position that the socket part closes the mentioned other end opening and the bead engages and extends in covering relation over the edge of the shroud part about the mentioned other and opening, and an inner diameter substantially equal to the outer diameter of the cup member foot portion and adapted to snugly receive the same when inserted; and the connector part is a thread bearing bolt element embedded in the foot part and a therewith co-acting nut element in engagement with the socket part and adapted to draw the socket and foot parts together to clamp the shroud part against relative movement therebetween whereby the base member secured to a tombstone provides, when the foot portion of the cup member extends into the socket part, means for removably supporting the cup member in flower or plant holding relation on a tombstone and, when the cup member engages the shoulder surface in an annular area adjacent the cup member opening, the cup member provides means for guarding the base member between use periods of the members.

2. In a flower or plant holder for a tombstone, a base member comprising a shroud part and a socket part;

a cup member having an end cylindrical foot portion;

means on the shroud part in engagement with the socket part for securing the parts together; and means on the shroud part adapted for engagement with a tombstone to secure the base member thereto, the provision in which the shroud part is a hollow sheet metal body with an end opening; and the socket part is a cylindrical metal thimble having an edge bead and an outer diameter substantially equal to the inner diameter of the end opening in the shroud part and being telescopically insertable therein to a position that the bead engages and extends in covering relation to the edge of the shroud part end opening and the end opening is thereby closed and an inner diameter substantially equal to the outer diameter of the cup member foot portion and being adapted to snugly receive the same when inserted whereby the cup member may be securely but removably mounted on the base member.

3. In a flower or plant holder for a tombstone, a base member comprising a shroud part and a socket part:

means on the shroud part in engagement with the socket part for securing the parts together; and a cup member having an end cylindrical foot portion;

the provision in which the shroud part is a hollow sheet metal body with an end opening; and the socket part is a cylindrical metal thimble having an edge bead and an outer diameter substantially equal to the inner diameter of the end opening in the shroud part and being telescopically insertable therein to a position that the bead engages and extends in covering relation to the edge of the shroud part end opening and the end opening is thereby closed and an inner diameter substantially equal to the outer diameter of the cup member foot portion and being adapted to snugly receive the same when inserted whereby the cup member may be securely but removably mounted in the socket part;

and the means for securing the shroud and socket parts together comprises thread bearing bolt and co-acting nut elements in engagement with the shroud and socket parts and adapted, when tightened, to draw and hold the shroud and socket parts together.

References Cited in the file of this patent

UNITED STATES PATENTS

| 779,924 | Gommel | Jan. 10, 1905 |
| 2,634,077 | Van Dusen | Apr. 7, 1953 |
| 2,996,208 | Schroeder | Aug. 15, 1961 |

FOREIGN PATENTS

| 736,966 | France | Sept. 26, 1932 |